United States Patent
Cousin et al.

(10) Patent No.: US 11,214,013 B2
(45) Date of Patent: Jan. 4, 2022

(54) CONNECTING ARRANGEMENT AND METHOD FOR WELDING A FIRST PLASTIC COMPONENT TO A SECOND PLASTIC COMPONENT

(71) Applicant: Robert Bosch GmbH, Stuttgart (DE)

(72) Inventors: Frederic Cousin, Freiberg am Neckar (DE); Werner Steinberger, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/629,011

(22) PCT Filed: Jun. 14, 2018

(86) PCT No.: PCT/EP2018/065909
§ 371 (c)(1),
(2) Date: Jan. 6, 2020

(87) PCT Pub. No.: WO2019/029872
PCT Pub. Date: Feb. 14, 2019

(65) Prior Publication Data
US 2020/0198255 A1  Jun. 25, 2020

(30) Foreign Application Priority Data

Aug. 8, 2017 (DE) .................... 10 2017 213 756.8

(51) Int. Cl.
*B29C 65/36* (2006.01)
*B29C 65/78* (2006.01)
*B29C 65/00* (2006.01)

(52) U.S. Cl.
CPC ........ *B29C 65/362* (2013.01); *B29C 65/3608* (2013.01); *B29C 65/3676* (2013.01);
(Continued)

(58) Field of Classification Search
CPC .............. B29C 65/362; B29C 65/3608; B29C 65/3676; B29C 65/3684; B29C 65/7814;
(Continued)

(56) References Cited

U.S. PATENT DOCUMENTS 3,680,496 A    8/1972  Westlake, Jr.
4,941,584 A    7/1990  Bowers et al.
(Continued)

FOREIGN PATENT DOCUMENTS

FR    1 225 774 A    7/1960
FR    1 581 045 A    9/1969
(Continued)

OTHER PUBLICATIONS

Machine Translation of FR-1581045-A (Year: 1969).*
(Continued)

*Primary Examiner* — Daniel McNally
(74) *Attorney, Agent, or Firm* — Maginot, Moore & Beck LLP (57) ABSTRACT

A connecting arrangement includes a first plastic component, a second plastic component, and a closed induction ring that is arranged between the first and second plastic components in a joining gap that is partially filled with molten plastic. The first plastic component has a first joining region that is configured as a stepped receiving opening with a first joining contour. The second plastic component has a second joining region that is configured as a stepped shoulder with a second joining contour. The second joining region is inserted into the first joining region to form the joining gap. The first and second joining contours are adapted to one another so as to center the first joining region, the second joining region, and the induction ring in the joining gap with (Continued)

respect to one another. A method in one embodiment includes welding the first and second plastic components of the connecting arrangement.

13 Claims, 6 Drawing Sheets

(52) U.S. Cl.
CPC ...... *B29C 65/3684* (2013.01); *B29C 65/7814* (2013.01); *B29C 65/7829* (2013.01); *B29C 66/1286* (2013.01); *B29C 66/1288* (2013.01); *B29C 66/54* (2013.01); *B29C 66/73921* (2013.01)

(58) Field of Classification Search
CPC . B29C 65/7829; B29C 66/1286; B29C 66/54; B29C 66/73921

See application file for complete search history.

(56) References Cited

U.S. PATENT DOCUMENTS

| | | | | |
|---|---|---|---|---|
| 5,958,173 A | * | 9/1999 | Hibble | ................ B01D 25/176 |
| | | | | 156/272.4 |
| 2014/0332155 A1 | * | 11/2014 | Barthel | ................... B29C 65/36 |
| | | | | 156/272.4 |

FOREIGN PATENT DOCUMENTS

| | | | | | |
|---|---|---|---|---|---|
| FR | 1581045 A | * | 9/1969 | ........... | B29C 66/131 |
| JP | S51-36286 A | | 3/1976 | | |
| JP | S51-55371 A | | 5/1976 | | |

OTHER PUBLICATIONS

International Search Report corresponding to PCT Application No. PCT/EP2018/065909, dated Sep. 10, 2018 German and English language document) (7 pages).

Sanders, P., Thermoplaste elektromagnetisch schweißen, Plastverarbeiter, Jul. 1986, pp. 80-83, No. 7, Speyer, W. Germany.

* cited by examiner

CONNECTING ARRANGEMENT AND METHOD FOR WELDING A FIRST PLASTIC COMPONENT TO A SECOND PLASTIC COMPONENT

This application is a 35 U.S.C. § 371 National Stage Application of PCT/EP2018/065909, filed on Jun. 14, 2018, which claims the benefit of priority to Serial No. DE 10 2017 213 756.8, filed on Aug. 8, 2017 in Germany, the disclosures of which are incorporated herein by reference in their entirety.

BACKGROUND

The disclosure is based on a connecting arrangement and a method for welding a first plastic component to a second plastic component.

In the case of electromagnetic resistance welding or else in the case of induction welding, eddy currents are induced in a closed annular metallic component or in an induction ring by an electromagnetic alternating field (typically 10 kHz to 40 kHz), which is generally created by a water-cooled coil. The induction ring heats up as a result of heat losses and, by heat conduction, leads to melting of the plastic polymers of the two parts to be joined, which are then connected and consolidated under pressure.

Figure 9:
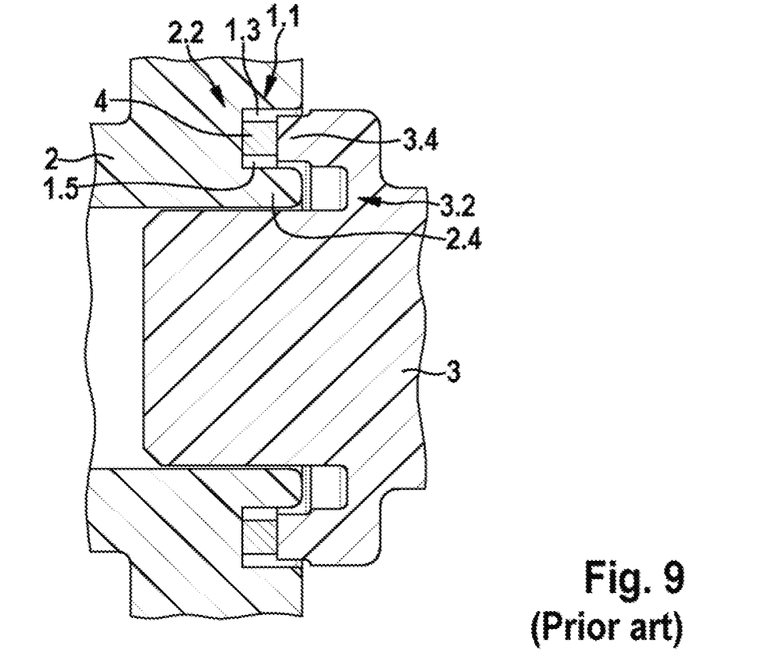
FIG. 9 shows a schematic sectional illustration of the connecting arrangement known from the prior art before the welding operation.
Figure 10:
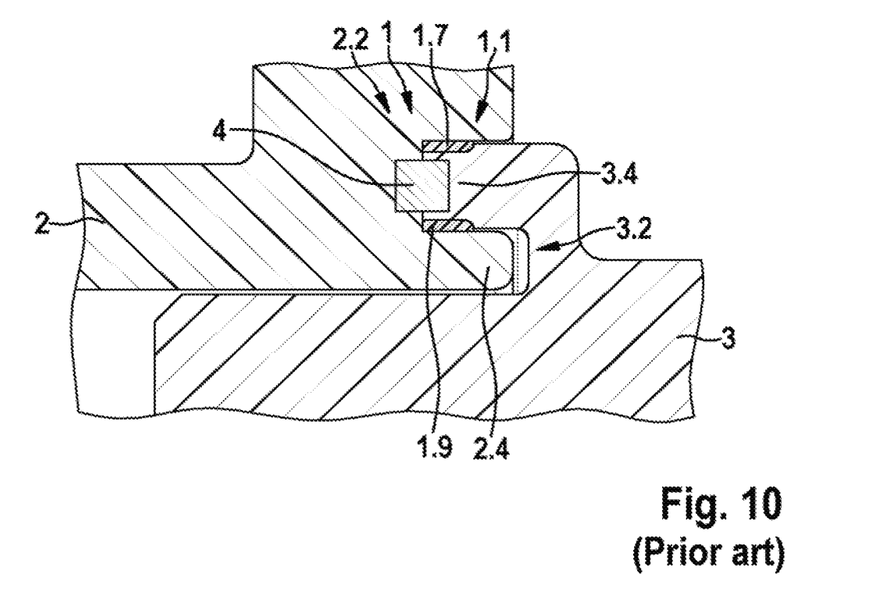
FIG. 10 shows a schematic sectional illustration of a defect-free connecting arrangement from FIG. 9 after the welding operation.
Figure 11:
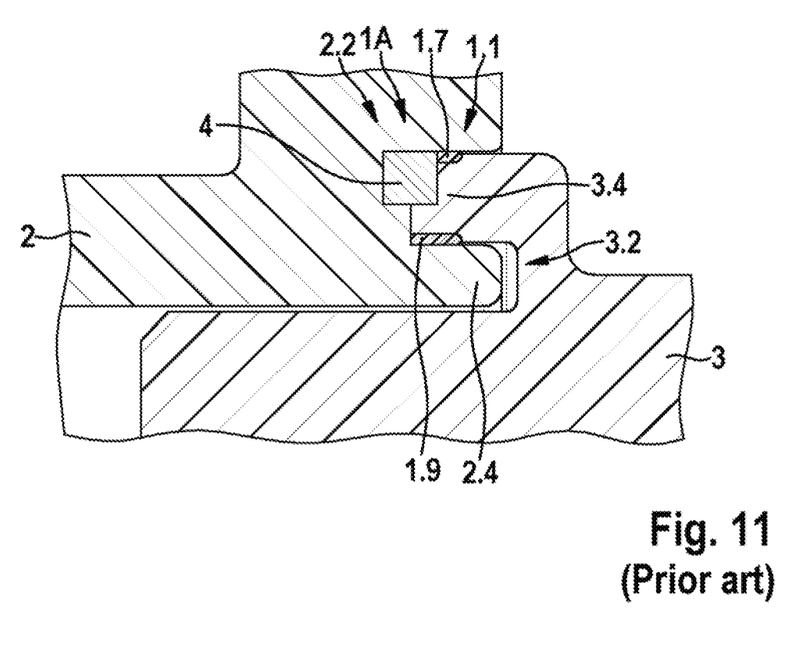
FIG. 11 shows a schematic sectional illustration of a defective connecting arrangement from FIG. 9 after the welding operation.

FIGS. 8 to 11 show a connecting arrangement 1, 1A, known from the prior art, having a first plastic component 2, a second plastic component 3 and a closed induction ring 4, which has a polygonal cross-section and is arranged in a joining gap 1.1 between the two plastic components 2, 3. As is apparent from FIGS. 8 and 9, the first plastic component 2 has a first joining region 2.2, which comprises a receiving opening, an encircling first collar 2.4 and a joining gap 1.1. The second plastic component 3 has a second joining region 3.2, which has a shoulder and an encircling second collar 3.4, a recess being formed between the shoulder and the encircling second collar 34. As is further apparent from FIG. 9, the induction ring 4 is arranged in the joining gap 1.1 between a bottom of the joining gap 1.1 and an end face of the second collar 3.4, which is likewise inserted in the joining gap 1.1. The first collar 2.4 is inserted in the recess between the second collar 3.4 and the shoulder. As is further apparent from FIG. 9, the induction ring 4 and the second collar 3.4 divide the joining gap 1.1 into a top ring gap 1.3 and a bottom ring gap 1.5. FIG. 9 shows the connecting arrangement 1, 1A before a welding operation, in which a coil (not illustrated) creates an alternating field which heats up the induction ring 4 by way of the induced eddy currents and leads to a local melting of the first plastic component 2 and the second plastic component 3 in the region of the joining gap 1.1. The two plastic components 2, 3 are then connected under pressure and the two ring gaps 1.3, 1.5 provided are filled with plastic melt 1.7, 1.9, as is apparent from FIG. 10. FIG. 10 shows the connecting arrangement 1 after the welding operation. As is apparent from FIG. 11, in the case of the connecting arrangement 1A illustrated, after the welding operation the induction ring 1.1 has an eccentric position such that, in contrast to FIG. 10, there is no formation of uniform ring gaps 1.3, 1.5 filled with plastic melt 1.7, 1.9. The ring gaps 1.3, 1.5, which are non-uniform or partially not present, may impair the quality of the connecting arrangement 1A illustrated.

SUMMARY

The connecting arrangement with the features of the disclosure and the method for welding a first plastic component to a second plastic component with the features of the disclosure have the advantage that the matching configuration of the first joining contour and the second joining contour has the effect that the first plastic component, the second plastic component and the induction ring are autonomously centered with respect to one another. This results in uniform ring gaps filled with plastic melt, such that the quality of the connecting arrangement or of the welding location can be improved.

Embodiments of the present disclosure provide a connecting arrangement having a first plastic component, a second plastic component and a closed induction ring which is arranged in a joining gap, filled at least partially with plastic melts, between the two plastic components. Here, the first plastic component has a first joining region, configured as a stepped receiving opening and with a first joining contour, and the second plastic component has a second joining region, configured as a stepped shoulder and with a second joining contour, the second joining region being inserted in the first joining region to form the joining gap and the first joining contour and the second joining contour being matched to one another and centering the first joining region and the second joining region and the induction ring with respect to one another in the joining gap.

A method for welding a first plastic component to a second plastic component is also proposed, a closed induction ring being arranged in a joining gap between the two plastic components. The closed induction ring is heated by an electromagnetic alternating field and melts the plastic polymers of the two plastic components, the molten plastic components being moved toward one another and welded to one another under pressure. In the process, the second plastic component is inserted into a first joining region, configured as a stepped receiving opening and with a first joining contour, of the first plastic component via a second joining region, configured as a stepped shoulder and with a second joining contour, to form the joining gap, the first joining region and the second joining region and the induction ring being autonomously centered with respect to one another by the matching joining contours.

Advantageous improvements of the connecting arrangement specified in the disclosure and of the method for welding a first plastic component to a second plastic component specified in the disclosure are made possible by the measures and refinements specified in the dependent claims.

It is particularly advantageous that it is possible for the closed induction ring to have a round cross-section and to consist of a metal or a conductive plastic or a plastic filled with ferromagnetic particles. In the case of the configuration of the induction ring from a plastic filled with ferromagnetic particles, no longer the eddy current losses but rather magnetic reversal losses are used to heat the induction ring. Moreover, the centered closed induction ring can uniformly divide the joining gap such that two uniform ring gaps that are separate from one another can be formed between the two plastic components and can each be uniformly filled with a plastic melt. The round cross-section advantageously reduces the notch effect in the joining gap such that the thermal shock resistance of the welded connection can be increased. The configuration as a metal ring makes a particularly cost-effective realization of the induction ring possible. In the case of the configuration of the induction ring from a conductive plastic or from a plastic filled with ferromagnetic particles, the coefficients of expansion of the two plastic components and of the induction ring can advantageously be harmonized in an improved manner. In addition, it is possible for the induction ring to melt, which can further enhance the quality of the connection. Moreover, the thermal shock resistance of the welded connection and thus also the quality of the welded connection can also be further improved by the configuration of the induction ring from conductive plastic.

In an advantageous refinement of the connecting arrangement, the two joining contours may each be configured as a hollow fillet with a predefined radius. Thus, for example, a transition between two different diameters of the stepped receiving opening and the stepped shoulder may be configured as a hollow fillet with a predefined radius. As an alternative, the two joining contours may each be configured as a bevel with a predefined angle of inclination. Thus, for example, the transition between two different diameters of the stepped receiving opening and the stepped shoulder may be configured at least partially as a bevel with a predefined angle of inclination. In the case of a particularly advantageous refinement of the connecting arrangement, the transition may be configured fully as a bevel with an angle of 45°. The self-centering of the components can be realized easily and cost-effectively by the configuration of the two plastic components with hollow fillets or bevels and by the round cross-section of the induction ring. Moreover, a connecting arrangement that is longer in the axial direction and can absorb higher bending moments is advantageously produced by these configurations. Furthermore, by the by omitting the collar, a smaller space requirement of the connecting arrangement in the radial direction is obtained.

In a further advantageous refinement of the connecting arrangement, at least one stop may be arranged on the first joining region and/or on the second joining region and can predefine a gap size of the joining gap. An end position of the two plastic components in relation to one another, and thus the gap size, can be predefined independently of component tolerances by the at least one stop.

In an advantageous refinement of the method, the gap size of the joining gap can be set during the relative movement of the two plastic components and the welding operation. The gap size of the joining gap can thus be predefined, for example, by way of at least one stop on the first joining region (22) and/or on the second joining region or on the welding tool. The gap size can be adjusted by the at least one stop when the two plastic components are moved together and welded during the connecting operation, such that the gap size is independent of component tolerances. The gap size may however also alternatively be set by stop faces that can be easily adjusted in the tool. Moreover, the volume of the two plastic components that is displaced by the induction ring may be predefined by predefining a cross-sectional area of the induction ring.

Exemplary embodiments of the disclosure are illustrated in the drawings and are explained in more detail in the following description. In the drawings, the same reference signs designate components or elements that perform the same or analogous functions.

DETAILED DESCRIPTION

As is apparent from FIGS. 1 to 8, illustrated exemplary embodiments of a connecting arrangement 10A, 10C according to the disclosure comprise in each case a first plastic component 20, 20A, 20B, 20C, a second plastic component 30, 30A, 30B, 30C and a closed induction ring 40, which is arranged in a joining gap 11, filled at least partially with plastic melts 17, 19, between the two plastic components 20, 20A, 20B, 20C, 30, 30A, 30B, 30C. Here, the first plastic component 20, 20A, 20B, 20C has a first joining region 22, configured as a stepped receiving opening 22A, 22B, 22C and with a first joining contour 24, and the second plastic component 30, 30A, 30B, 30C has a second joining region 32, configured as a stepped shoulder 32A, 32B, 32C and with a second joining contour 34. The second joining region 32 is inserted in the first joining region 22 to form the joining gap 11, the first joining contour 24 and the second joining contour 34 being matched to one another and centering the first joining region 22 and the second joining region 32 and the induction ring 40 with respect to one another in the joining gap 11.

As is further apparent from FIGS. 1 to 7, in the exemplary embodiments illustrated, the closed induction ring 40 has a round cross-section and consists of a metal.

In the case of an alternative exemplary embodiment (not illustrated), the induction ring 40 may be produced from a conductive plastic or from a plastic filled with ferromagnetic particles. As is apparent from FIGS. 2, 4 and 6, the closed induction ring 40 divides the joining gap 11 such that two ring gaps 13, 15 that are separate from one another are formed between the two plastic components 20, 20A, 20B, 20C, 30, 30A, 30B, 30C and can each be filled with a plastic melt 17, 19 during the welding operation.

Figure 1:
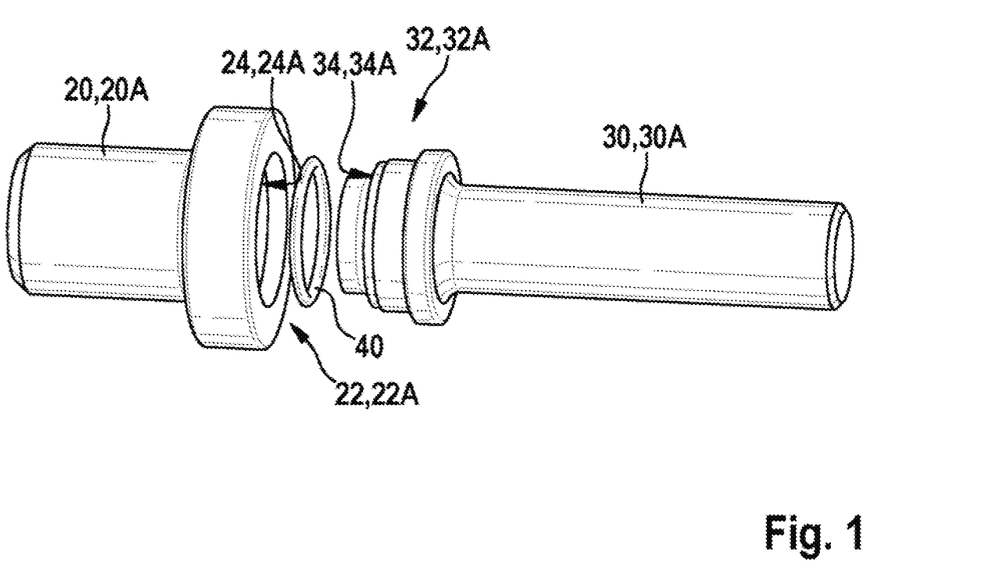
FIG. 1 shows a schematic perspective illustration of components for a first exemplary embodiment of a connecting arrangement according to the disclosure.
Figure 2:
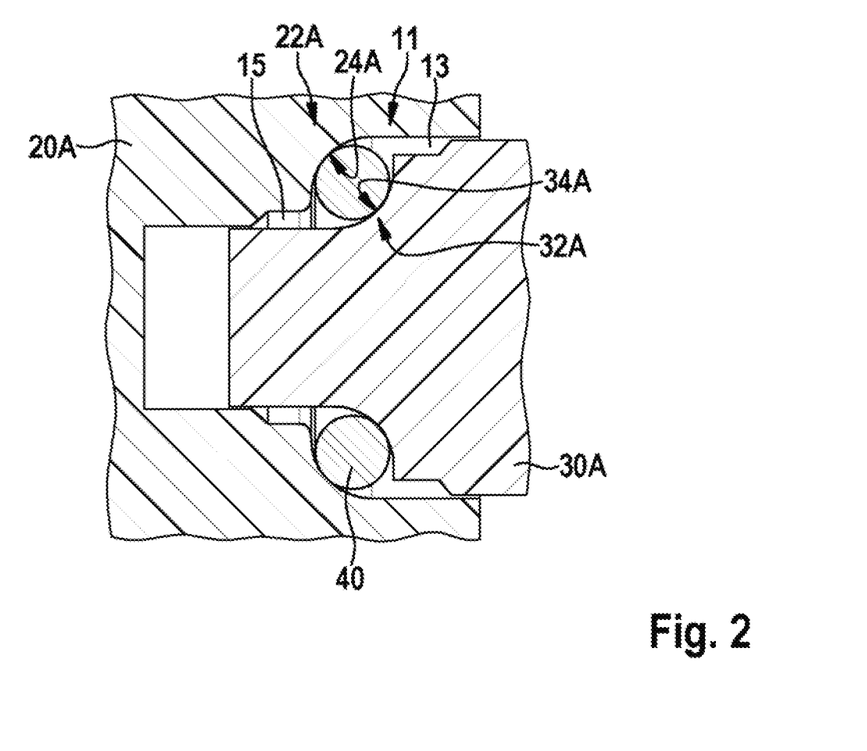
FIG. 2 shows a schematic sectional illustration of the first exemplary embodiment of a connecting arrangement according to the disclosure before the welding operation.
Figure 3:
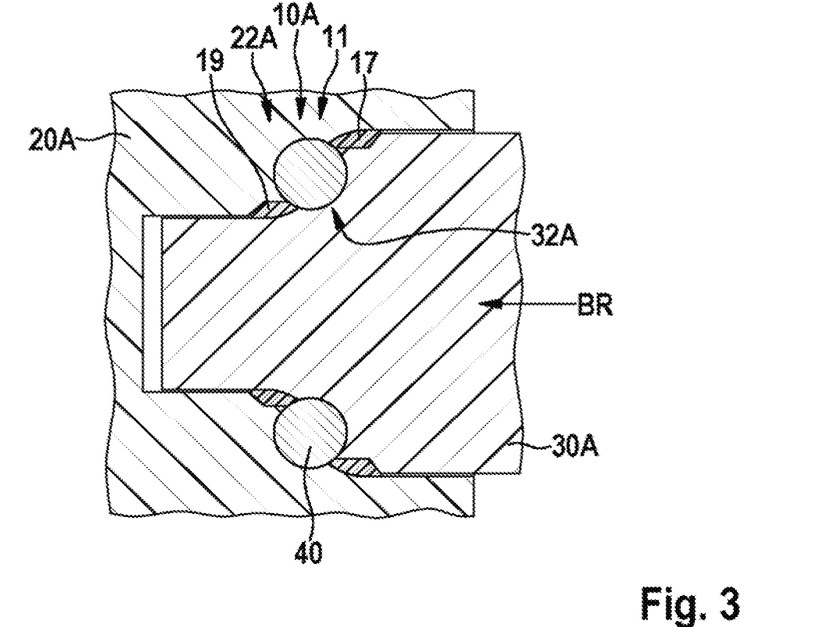
FIG. 3 shows a schematic sectional illustration of the connecting arrangement according to the disclosure from FIG. 2 after the welding operation.

As is further apparent from FIGS. 1 to 3, in the first exemplary embodiment illustrated, the two joining contours 24, 34 are each configured as a hollow fillet 24A, 34A with a predefined radius. In the exemplary embodiment illustrated, a transition between two different diameters of the stepped receiving opening 22A and the stepped shoulder 32A is configured as a hollow fillet with a predefined radius. The two plastic components 20, 20A, 30, 30A, and in particular the induction ring 40, are autonomously centered with respect to one another by the hollow fillets 24A, 34A and the round cross-section of the induction ring 40 when moved together and during the welding operation. As a result, uniform ring gaps 13, 15 which are uniformly filled with plastic melt 17, 19 are formed. This advantageously allows the quality of the welding location to be improved. As a result of the missing collars, more degrees of freedom for the parting of the mold in the tool are obtained, especially for the first plastic component 20, 20A. Moreover, by omitting the collars, a smaller space requirement of the connecting arrangement 10A in the radial direction is obtained. Furthermore, longer welded connections in the axial direction are produced such that the connecting arrangement 10A can absorb higher bending moments.

Figure 4:
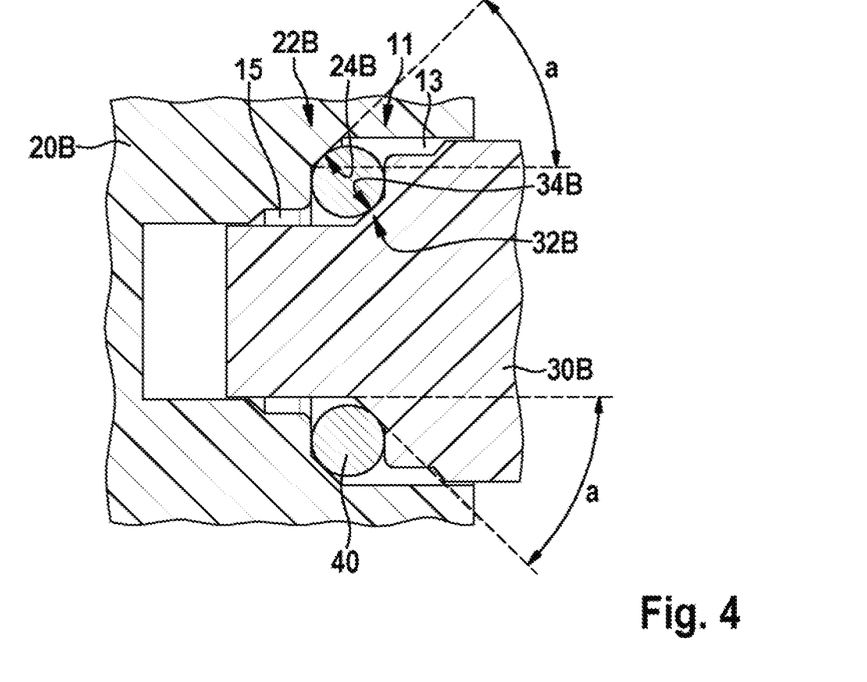
FIG. 4 shows a schematic sectional illustration of a second exemplary embodiment of a connecting arrangement according to the disclosure before the welding operation.

As is further apparent from FIG. 4, in the second exemplary embodiment illustrated, the two joining contours 24, 34 are each configured as a bevel 24B, 34B with a predefined angle of inclination a. In the exemplary embodiment illustrated, a transition between two different diameters of the stepped receiving opening 22B and the stepped shoulder 32B is configured at least partially as a bevel 24B, 34B with the predefined angle of inclination a. In the exemplary embodiment illustrated, the angle of inclination a has a value of 45°. The two plastic components 20B, 30B, and in particular the induction ring 40, are autonomously centered with respect to one another by the bevels 24B, 34B and the round cross-section of the induction ring 40 when moved together and during the welding operation. As a result, uniform ring gaps 13, 15 which can be uniformly filled with plastic melt 17, 19 are formed. This advantageously allows the quality of the welding location to be improved. As a result of the missing collars, more degrees of freedom for the parting of the mold in the tool and a smaller space requirement in the radial direction are obtained, especially for the first plastic component 20B, in the second exemplary embodiment as well. Furthermore, longer welded connections in the axial direction are produced in the case of the configuration of the joining contours 24, 34 as bevels 24B, 34B as well.

Figure 5:
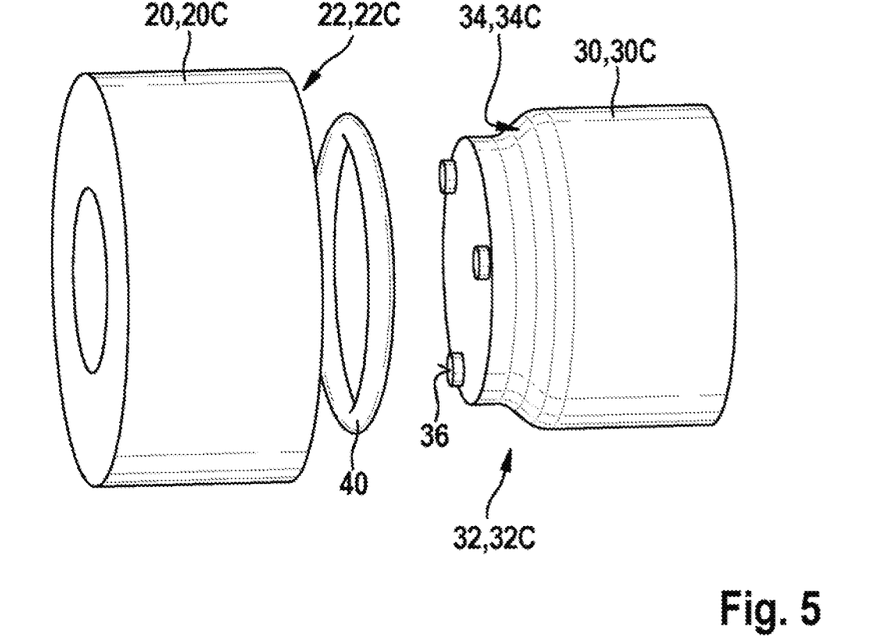
FIG. 5 shows a schematic perspective illustration of components for a third exemplary embodiment of a connecting arrangement according to the disclosure.
Figure 6:
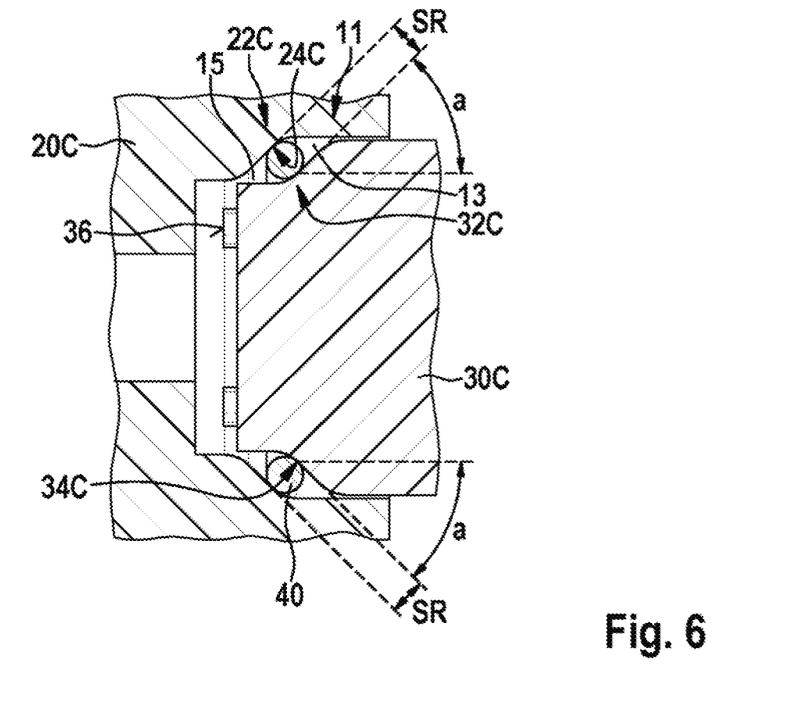
FIG. 6 shows a schematic sectional illustration of the third exemplary embodiment of a connecting arrangement according to the disclosure before the welding operation.
Figure 7:
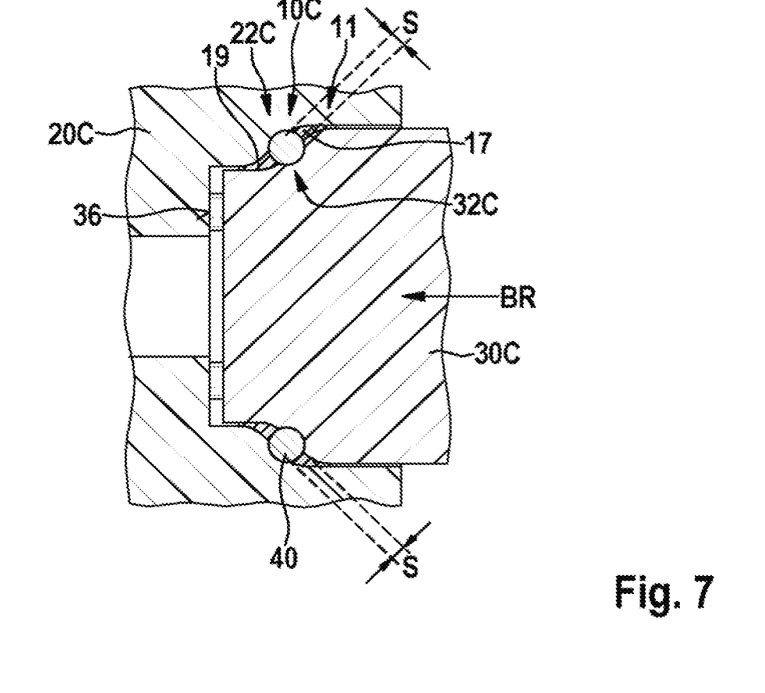
FIG. 7 shows a schematic sectional illustration of the connecting arrangement according to the disclosure from FIG. 6 after the welding operation.
Figure 8:
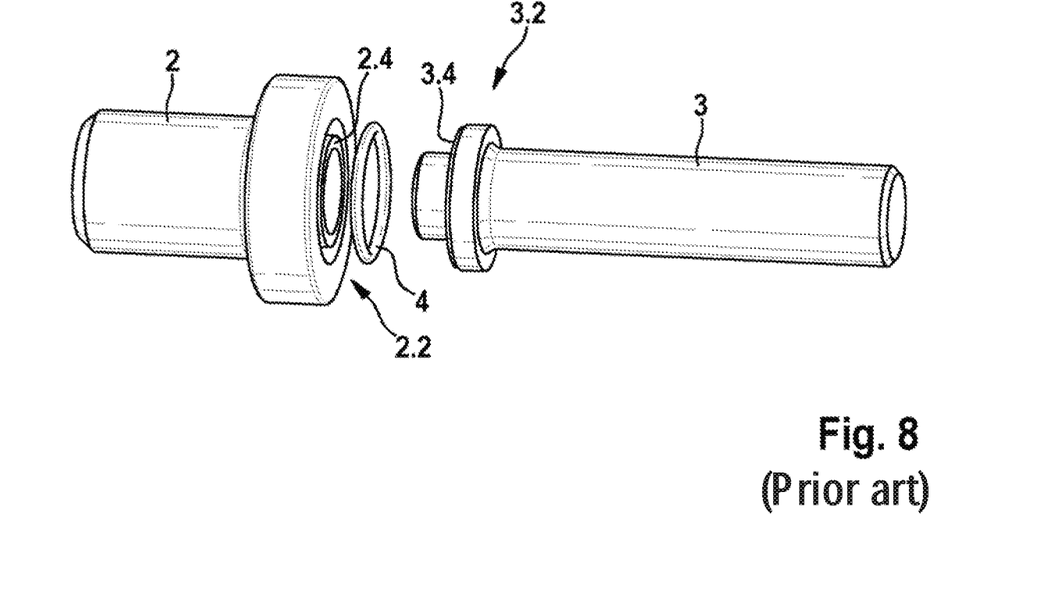
FIG. 8 shows a schematic perspective illustration of components for a connecting arrangement known from the prior art.

As is further apparent from FIGS. 5 to 7, in the third exemplary embodiment illustrated, a plurality of stops 36 are arranged on the second joining region 32, 32C and predefine a gap size S, SR of the joining gap 11. Moreover, in the third exemplary embodiment illustrated, the two joining contours 24, 34 are each configured as a bevel 24C, 34C with a predefined angle of inclination a.

In contrast to the second exemplary embodiment, in the third exemplary embodiment illustrated, the transition between two different diameters of the stepped receiving opening 22C and the stepped shoulder 32C is in each case configured fully as a bevel 24C, 34C with a predefined angle of inclination a. In the exemplary embodiment illustrated, the angle of inclination a has a value of 45°. This results in a geometry that is once again simplified in comparison with the second exemplary embodiment. The two plastic components 20C, 30C and, in particular the induction ring 40, are autonomously centered with respect to one another by the bevels 24C, 34C with the angle of inclination a of 45° and the round cross-section of the induction ring 40 when moved together and during the welding operation. This results in uniform ring gaps 13, 15 which can be uniformly filled with plastic melt 17, 19. At the same time, the gap size S, SR can be adjusted when the plastic components 20, 20C, 30, 30C are moved together and welded during the welding operation and is therefore more independent of component tolerances.

In the case of embodiments of the method according to the disclosure for welding a first plastic component 20, 20A, 20B, 20C to a second plastic component 30, 30A, 30B, 30C, a closed induction ring 40 is arranged in a joining gap 11 between the two plastic components 20, 20A, 20B, 20C, 30, 30A, 30B, 30C. The closed induction ring 40 is then heated by an electromagnetic alternating field and melts the plastic polymers of the two plastic components 20, 20A, 20B, 20C, 30, 30A, 30B, 30C, the molten plastic components 20, 20A, 20B, 20C, 30, 30A, 30B, 30C being moved toward one another and welded to one another under pressure. Here, the second plastic component 30, 30A, 30B, 30C is inserted into a first joining region 22, configured as a stepped receiving opening 22A, 22B, 22C and with a first joining contour 24, of the first plastic component 20, 20A, 20B, 20C via a second joining region 32, configured as a stepped shoulder 32A, 32B, 32C and with a second joining contour 34, to form the joining gap 11, the first joining region 22 and the second joining region 32 and the induction ring 40 being autonomously centered with respect to one another by the matching joining contours 24, 34.

As a result of the tolerances that are expediently achievable in an injection molding process, the ring gaps 13, 15 filled with plastic melt 17, 19 can vary greatly. The mechanical load-bearing capacity of the connecting arrangement 10A, 10C can therefore likewise vary very greatly with the gap sizes S, SB, set by the tolerances, of the ring gaps 13, 15. Therefore, the gap size S, SR of the joining gap 11 of the third exemplary embodiment of the connecting arrangement 10C is set during the relative movement of the two plastic components 20, 20C, 30, 30C and the welding operation. In the third exemplary embodiment illustrated, the gap size S, SR of the joining gap 11 is predefined by way of the three stops 36 on the first joining region 22C. Here, SB designates the gap size of the joining gap 11 before the welding operation and S designates the gap size of the joining gap 11 filled with plastic melt 15, 17 after the welding operation. In the case of an alternative exemplary embodiment (not illustrated), the at least one stop 36 may be predefined on the second joining region 32. Moreover, the gap size S, SR may however also alternatively be set by stop faces that can be easily adjusted in the welding tool.

Moreover, a volume of the two plastic components 20, 20C, 30, 30C that is displaced by the induction ring 40 can be predefined by predefining a cross-sectional area of the induction ring 40. The associated joining gap 11 can be adjusted by the amount by which the second plastic component 30, 30C and the induction ring 40 settle into place during welding as a result of the direction of movement BR during the welding operation.

The invention claimed is:

1. A connecting arrangement, comprising:
   a first plastic component having a first joining region configured as a stepped receiving opening with a first joining contour;
   a second plastic component having a second joining region configured as a stepped shoulder with a second joining contour, the second joining region inserted in an insertion direction into the first joining region to form a joining gap; and
   a closed induction ring arranged in the joining gap between the first and second plastic components with the joining gap filled at least partially with plastic melts,
   wherein the first joining contour and the second joining contour are matched to one another and configured to center the first joining region, the second joining region, and the induction ring with respect to one another in the joining gap, and wherein the joining gap and closed induction ring are configured such that the closed induction ring uniformly divides the joining gap into two uniform ring gaps in the insertion direction separate from one another and each uniformly filled with the plastic melt.

2. The connecting arrangement as claimed in claim 1, wherein the closed induction ring has a round cross-section and consists of a metal or a conductive plastic or a plastic filled with ferromagnetic particles.

3. The connecting arrangement as claimed in claim 1, wherein the first and second joining contours are each configured as a hollow fillet with a predefined radius.

4. The connecting arrangement as claimed in claim 1, wherein the first and second joining contours are each configured as a bevel with a predefined angle of inclination.

5. The connecting arrangement as claimed in claim 1, wherein at least one stop is arranged on one or more of the first joining region and the second joining region and predefines a gap size of the joining gap.

6. A method for welding a first plastic component to a second plastic component, comprising:
    arranging a closed induction ring in a joining gap between the first and second plastic components, the first plastic component having a first joining region configured as a stepped receiving opening with a first joining contour, the second plastic component having a second joining region configured as a stepped shoulder with a second joining contour, the second joining region inserted in the first joining region to form the joining gap;
    centering the first joining region, the second joining region, and the induction ring with respect to one another via the first and second joining contours, which are matched to one another to provide the centering;
    heating the closed induction ring by an electromagnetic alternating field and melting the plastic polymers of the first and second plastic components; and
    moving the molten first and second plastic components toward one another and welding the first and second plastic components to one another under pressure, wherein a gap size of the joining gap outside the closed induction ring is set during the relative movement of the first and second plastic components and the welding operation.

7. The method as claimed in claim 6, wherein the gap size of the joining gap is predefined by way of at least one stop on one or more of the first joining region and the second joining region or on a welding tool.

8. The method as claimed in claim 6, wherein a volume of the first and second plastic components that is displaced by the induction ring is predefined by predefining a cross-sectional area of the induction ring.

9. A connecting arrangement, comprising:
    a first plastic component having a first joining region configured as a stepped receiving opening with a first joining contour;
    a second plastic component having a second joining region configured as a stepped shoulder with a second joining contour, the second joining region inserted in the first joining region to form a joining gap; and
    a closed induction ring arranged in the joining gap between the first and second plastic components in contact with the first and second joining contours, with the joining gap filled at least partially with plastic melts,
    wherein the first joining contour and the second joining contour are matched to one another and configured to center the first joining region, the second joining region, and the induction ring with respect to one another in the joining gap,
    wherein the first and second joining contours are each configured as a bevel at a predefined angle of inclination.

10. The connecting arrangement as claimed in claim 9, wherein the closed induction ring has a round cross-section and consists of a metal or a conductive plastic or a plastic filled with ferromagnetic particles.

11. The connecting arrangement as claimed in claim 9, wherein the centered closed induction ring uniformly divides the joining gap such that two uniform ring gaps that are separate from one another are formed between the first and second plastic components and are each uniformly filled with the plastic melt.

12. The connecting arrangement as claimed in claim 9, wherein at least one stop is arranged on one or more of the first joining region and the second joining region and predefines a gap size of the joining gap.

13. A connecting arrangement, comprising:
    a first plastic component having a first joining region configured as a stepped receiving opening with a first joining contour;
    a second plastic component having a second joining region configured as a stepped shoulder with a second joining contour, the second joining region inserted in the first joining region to form a joining gap; and
    a closed induction ring arranged in the joining gap between the first and second plastic components with the joining gap filled at least partially with plastic melts,
    wherein the first joining contour and the second joining contour are matched to one another and configured to center the first joining region, the second joining region, and the induction ring with respect to one another in the joining gap, and
    wherein the first and second joining contours are each configured as a hollow fillet with a predefined radius.

* * * * *